(12) United States Patent
Reilly et al.

(10) Patent No.: US 7,779,853 B2
(45) Date of Patent: Aug. 24, 2010

(54) PROPORTIONAL PRESSURE CONTROL VALVE

(75) Inventors: Joseph P. Reilly, Grayslake, IL (US); Kevin J. Cassaidy, Mount Prospect, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 978 days.

(21) Appl. No.: 10/598,264

(22) PCT Filed: Feb. 8, 2005

(86) PCT No.: PCT/US2005/003842

§ 371 (c)(1),
(2), (4) Date: Aug. 23, 2006

(87) PCT Pub. No.: WO2005/083542

PCT Pub. Date: Sep. 9, 2005

(65) Prior Publication Data

US 2007/0163662 A1     Jul. 19, 2007

Related U.S. Application Data

(60) Provisional application No. 60/547,332, filed on Feb. 24, 2004.

(51) Int. Cl.
F15B 13/043    (2006.01)
(52) U.S. Cl. ............... 137/14; 137/625.61; 137/625.64
(58) Field of Classification Search ............ 137/625.64, 137/625.61, 14
See application file for complete search history.

(56) References Cited

U.S. PATENT DOCUMENTS 2,896,588 A * 7/1959 Hayner et al. .......... 137/625.61
3,029,830 A   4/1962 Klover et al.

(Continued)

FOREIGN PATENT DOCUMENTS

DE    198 29 549 A1    5/1998

(Continued)

OTHER PUBLICATIONS

Notification of Transmittal of the International Search Report and the Written Opinion of the International Searching Authority, or the Declaration in corresponding International Application No. PCT/US2005/003842.

Primary Examiner—John Rivell
Assistant Examiner—Craig Price
(74) Attorney, Agent, or Firm—John A. Molnar, Jr.

(57) ABSTRACT

A proportional pressure control valve particularly for electro-hydraulic transmissions. The valve includes a cage having pump, clutch, and tank port openings. A spool is received within the cage for controlling flow between the clutch port and the pump and tank ports of the system. The spool has a feedback pressure surface responsive to an applied feedback fluid pressure urging the spool to move towards a first position allowing flow between the clutch and tank ports. A feedback pressure chamber is defined within the cage for developing the feedback fluid pressure. A clutch port pressure feedback passage couples the clutch port with the feedback pressure chamber for admitting flow from the clutch port into the feedback pressure chamber to develop the feedback fluid pressure. The clutch port pressure feedback passage is formed within the cage wall to couple the control pressure chamber in fluid communication with the system clutch port.

18 Claims, 5 Drawing Sheets

U.S. PATENT DOCUMENTS

| | | | |
|---|---|---|---|
| 3,286,734 A | 11/1966 | Hartshorne | |
| 3,410,308 A * | 11/1968 | Moog, Jr. et al. | 137/625.61 |
| 3,430,656 A * | 3/1969 | Hawk | 137/625.61 |
| 3,443,594 A | 5/1969 | Frayer | |
| 3,537,467 A | 11/1970 | Marshall | |
| 3,856,047 A * | 12/1974 | Takayama | 137/625.61 |
| 4,313,468 A | 2/1982 | Patel | |
| 4,527,592 A | 7/1985 | Dotti et al. | |
| 4,567,914 A | 2/1986 | Coppola et al. | |
| 4,662,605 A * | 5/1987 | Garcia | 137/625.65 |
| 4,674,613 A | 6/1987 | Sikorski | |
| 4,741,364 A | 5/1988 | Stoss et al. | |
| 4,785,849 A | 11/1988 | Masuda | |
| 4,875,501 A | 10/1989 | Ichihashi et al. | |
| 4,911,469 A | 3/1990 | Kawarasaki | |
| 4,922,964 A | 5/1990 | Buscher | |
| 4,966,195 A | 10/1990 | McCabe | |
| 5,024,459 A | 6/1991 | Kokubo et al. | |
| 5,031,663 A | 7/1991 | Fukuta et al. | |
| 5,042,832 A | 8/1991 | Takahashi et al. | |
| 5,051,631 A | 9/1991 | Anderson | |
| 5,054,599 A | 10/1991 | Marcott | |
| 5,062,454 A | 11/1991 | Ichihashi et al. | |
| 5,174,338 A | 12/1992 | Yokota et al. | |
| 5,553,827 A * | 9/1996 | Perkey | 137/625.64 |
| 5,836,335 A * | 11/1998 | Harms et al. | 137/14 |
| 6,286,535 B1 | 9/2001 | Harms et al. | |
| 6,343,621 B1 * | 2/2002 | Holmes et al. | 137/625.61 |
| 6,405,746 B2 | 6/2002 | Harms et al. | |
| 6,571,828 B2 | 6/2003 | Harms et al. | |
| 2002/0092573 A1 | 7/2002 | Harms et al. | |
| 2006/0081298 A1 * | 4/2006 | Segi et al. | 137/625.64 |

FOREIGN PATENT DOCUMENTS

| | | |
|---|---|---|
| GB | 2 102 158 | 1/1983 |
| JP | 1-199081 | 8/1989 |

* cited by examiner

PROPORTIONAL PRESSURE CONTROL VALVE

CROSS REFERENCE TO RELATED APPLICATIONS

This is a national phase application under 35 U.S.C. §371 of International Application No. PCT/US2005/03842 filed on Feb. 8, 2005 and which designated the United States, and which claims priority to U.S. Patent Application Ser. No. 60/547,332 filed on Feb. 24, 2004, the disclosures of which are incorporated herein by reference.

BACKGROUND OF THE INVENTION

The present invention relates broadly to proportional pressure control valves such as for use in the control circuits of electro-hydraulic transmissions having hydraulically operated clutches or other.

As is further described in commonly-assigned U.S. Pat. Nos. 6,571,828; 6,405,746; 6,286,535; and 5,836,335, and U.S. Publ. Pat. Appln. No. 2003/0188788, automobiles, trucks, tractors, earth-movers, and other vehicles (hereinafter collectively referred to as vehicles) frequently include an internal combustion engine for powering their movement across the earth's surface. Such vehicles also includes a drive train for transmitting energy produced by the internal combustion engine into movement of the wheels, drive tracks or similar means by which the vehicle is driven across the earth's surface. To effectively accommodate the power characteristics of the internal combustion engine to the load of the vehicle that it must drive at various speeds over varying terrain, an vehicle's drive train usually includes one or more transmissions. Each transmission in an vehicle includes a transmission power input shaft that receives energy from the internal combustion engine's power output shaft, and a transmission power output shaft for transmitting the engine's energy onto the means for driving the vehicle across the earth's surface. Each transmission in an vehicle also includes sets of gears, each one of which, when selected for coupling the transmission's power input shaft to its power output shaft, provides a different speed ratio between the rotation rates, respectively, of the transmission's power input and power output shafts.

To facilitate selecting a particular gear ratio and for smoothly accelerating an vehicle from a stationary start, its drive train usually includes a clutch located between the vehicle's internal combustion engine and its transmission(s). This clutch selectively couples the internal combustion engine's power output shaft to the transmission's power input shaft. In one position of the clutch, it completely decouples the engine's power output shaft from the transmission's power input shaft. In another position, the clutch of an vehicle provides a tight coupling between the internal combustion engine's power output shaft and the transmission's power input shaft. In this tightly coupled state, the internal combustion engine's power output shaft and the transmission's power input shaft rotate at the same speed. However, most clutches for vehicles operating in this tightly coupled state are capable of passing only some maximum amount of torque from the internal combustion engine to the transmission without slippage occurring in the clutch. If a torque greater than this maximum amount is supplied to the clutch in its tightly coupled state, slippage occurs within the clutch that allows the power output shaft of the internal combustion engine to rotate at a speed different from that of the transmission's power input shaft.

Between these two extremes of clutch operation, either of being decoupled or of being tightly coupled, the design of most clutches used in vehicles permit progressively varying the tightness of coupling between the engine's power output shaft and the transmission's power input shaft. In intermediate states between these two extremes, the clutch will transmit an amount of torque to the transmission without slippage that is less than the maximum amount that it will transmit when tightly coupled. Controllably coupling differing amounts of torque from the internal combustion engine to the means for driving the vehicle across the earth's surface permits smoothly accelerating an vehicle into motion. Controllably coupling different amounts of torque from the internal combustion engine to the means for driving the vehicle through the clutch is also useful, particularly for heavy industrial vehicles such as trucks, tractors and the like when shifting the transmission smoothly from a set of gears having one ratio to another set having a different ratio.

Historically, a driver of an vehicle usually operated its clutch through a direct mechanical linkage between the clutch and a clutch pedal located in the vehicle's passenger compartment near the driver. In some instances, a closed hydraulic system for operating the clutch by pressure on the clutch pedal replaces the direct mechanical linkage. More recently, to provide automatic electronic control of gear ratio selection, particularly in vehicle's that include a microprocessor, it has become desirable to control clutch operation by means of an electrical signal rather than by the driver pressing on a clutch pedal. While some designs for clutches are known that permit an electrical current to directly effect coupling and uncoupling of the clutch, such clutches generally consume, and must therefore also dissipate, a significant amount of electrical power. Thus, even with microprocessor controlled operation of an vehicle's transmission, it still appears desirable to continue controlling clutch operation indirectly by converting a control electrical signal from the microprocessor into a more powerful mechanical driving force for directly operating a conventional clutch.

In pursuing this indirect electronic control of vehicle clutches, some vehicle manufacturers have chosen to employ electro-hydraulic transmissions having hydraulically operated clutches. In such electro-hydraulic transmissions, a hydraulic pump supplies pressurized hydraulic fluid for energizing a hydraulic actuator, for example a piston or a bellows, that directly operates the clutch. In one design for such a clutch, springs hold the clutch in its disengaged position and a carefully controlled pressure of the hydraulic fluid from the pump overcomes the springs' force to effect engagement of the clutch. When the hydraulic pressure is removed from this clutch, the springs once again move the clutch into its disengaged state. By using the spring pressure to effect clutch disengagement and hydraulic pressure to effect clutch engagement, the clutch inherently disconnects the engine from the transmission when the engine is not running to power the hydraulic fluid pump. Furthermore, this method of operating an electro-hydraulic clutch inherently avoids creating a hazardous condition if the hydraulic fluid pump fails. With such an electro-hydraulically operated clutch, smoothly accelerating the vehicle into motion and smoothly shifting transmission gear ratios require a hydraulic valve that controls the pressure of the hydraulic fluid supplied to the clutch precisely in response to changing values of the controlling electrical signal.

Solenoid-piloted proportional pressure control valves of the type herein involved for use in electro-hydraulic transmissions are sold commercially by the Integrated Hydraulics Division North America of Parker Hannifin Corporation, Lincolnshire, Ill. These valves and others have proved satisfactory for a diversity of uses, and heretofore have constituted the state of the art. It is believed, however, that further developments in the construction and operation of such valves would be well-received by industry. In this regard, it a believed a preferred construction for certain applications would allow for stable operation even at high flow rates.

SUMMARY OF THE INVENTION

The present invention is directed, broadly, to proportional pressure control valves for controlling the flow of a fluid in a fluid power system. More particularly, the invention is directed to a 3-way, 2-position valve construction of such type which is particularly adapted for use in the control circuits of electro-hydraulic transmissions for controlling the operation of a clutch or other hydraulically-operated actuator or component.

The proportional pressure control valve of the present invention includes a hollow cage which extends in an axial and a radial direction and includes a wall having openings which may be respectively coupled in fluid communication with, for example, the clutch, pump, and tank ports of an electro-hydraulic transmission system. The pump port in such system may receive hydraulic fluid from a pump at a pressure provided by the pump, with the clutch port supplying pressurized hydraulic fluid to a hydraulic clutch or other actuator or component at a pressure that is controlled by the valve. Hydraulic fluid from the clutch otherwise is returned to a tank via the tank port.

A spool is received within the cage to be movable axially along the length thereof for controlling fluid flow between the clutch port opening of the cage and either the pump or tank port opening. A solenoid or other electromagnetically-operated pilot valve may be used to regulate a control fluid pressure that may be developed from a pilot flow into a control pressure chamber defined within the cage. Such control pressure chamber may be applied to a control pressure surface of the spool urging the spool to move axially along the length of the cage to a first position allowing fluid flow between the pump and clutch ports, and closing flow between the clutch and tank ports.

A feedback pressure passage couples the clutch port in fluid communication to a feedback pressure chamber which also may be defined within the cage. Fluid pressure which may be developed from a feedback flow into the feedback pressure chamber may be applied to a feedback surface of the spool urging it to move along the length of the cage to a second position allowing fluid flow between the clutch and tank ports, and closing flow between the pump and clutch ports. The feedback pressure passage, which may include a feedback restriction orifice for restricting the rate at which fluid may flow between the clutch port and the feedback pressure chamber, is formed within the thickness dimension of the cage wall to extend intermediate a first port in fluid communication with the control pressure chamber and a second port in fluid communication with the clutch port of the system.

Advantageously, by relocating the feedback pressure passage, which heretofore had been provided as a drilled flow passage within the spool, a truer clutch pressure may be sensed and communicated into the feedback pressure chamber insofar as the clutch port is directly coupled to the chamber via the passage. In this regard, the effects of pressure losses in the clutch pressure attributable to the pressure drop of fluid flow across the cage openings may be eliminated. Moreover, by isolating the passage from the high velocity flow of fluid through the openings, a more static-like clutch pressure may be measured, particularly as the clutch pressure is being ramped-up. Ultimately, the throughput of the valve of the present invention may be increased without appreciably affecting its stability of operation.

The present invention, accordingly, comprises the assembly possessing the construction, combination of elements, and arrangement of parts and steps which are exemplified in the detailed disclosure to follow. Advantages of the invention include a valve construction that particularly suited for use in applications requiring high flow rates. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" or "horizontal" and "axial" or "vertical" referring, respectively, to directions, axes, planes perpendicular and parallel to the central longitudinal axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes of the discourse to follow, the precepts of the proportional pressure control valve construction of the present invention are described in connection with a solenoid-piloted, cartridge-type configuration is particularly adapted for screw-in or other, such as plug-in, manifold-mount applications within a hydraulic circuit for controlling, for example, the operation of an electro-hydraulic transmission for tractors, trucks, heavy equipment, and other vehicular or mobile applications. It will be appreciated, however, that aspects of the present invention may find application in other valve constructions, such as those of a designed for other modes of actuation such as mechanical or pneumatic, and in other fluid power, automation, or control systems calling for similar functionalities. Use within those such other constructions and applications therefore should be considered to be expressly within the scope of the invention herein involved.

Figure 1:
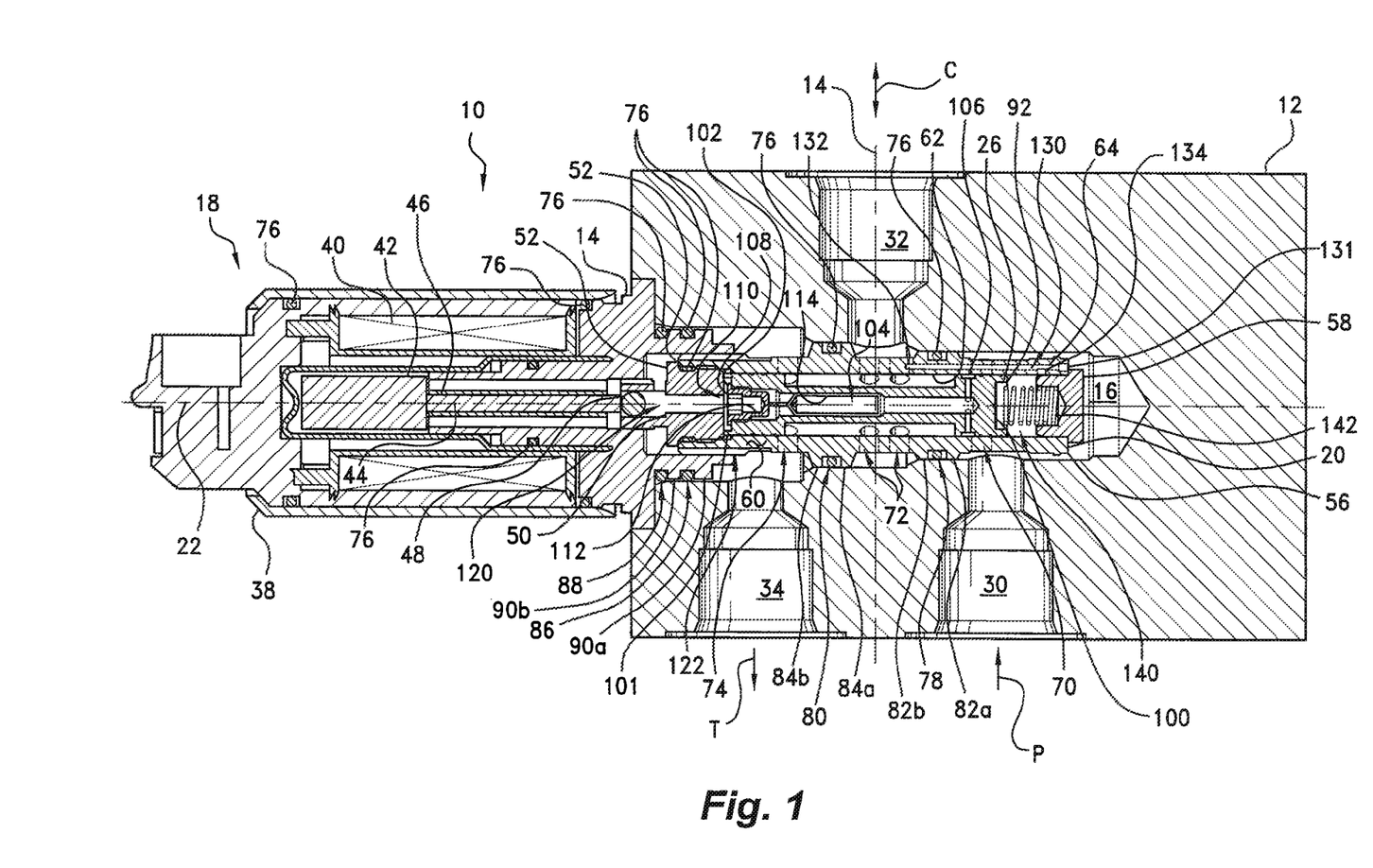
FIG. 1 is an axial cross-section view of a representative embodiment of valve construction according to the present invention as shown in a de-energized orientation.

Referring then to the figures wherein corresponding reference characters are used to designate corresponding elements throughout the several views with equivalent elements being referenced with prime or sequential alphanumeric designations, a proportional pressure control valve construction in accordance with the present invention is shown in a de-energized state generally at 10 in the cross-sectional view of FIG. 1, as mounted within a manifold or other mount, 12, of a fluid power system which may be an electro-hydraulic transmission. In basic construction, valve 10 includes flange-like adapter body, 14, which may be configured for a screw-in, plug-in, or other mounting into a bore, 16, of the manifold 12. Adapter body 14 has opposite ends to which at one end is threadably, interference-fit, or otherwise connected a solenoid pilot valve subassembly, referenced at 18, and at the opposite end is threadably, interference-fit, or otherwise connected an elongate, generally tubular cage, 20, which extends in an axial direction along a central longitudinal axis, 22, and in a radial direction, such as is represented by the axis 24. A spool, 26, is received within cage 20 to be axially slidably moveable therewithin along axis 22.

Manifold 12 may be provided as having bores 30, 32, and 34, each of which may open, for example, radially into common fluid communication with bore 16. As integrated within the electro-hydraulic transmission or other fluid power system, bore 30 may be coupled in fluid communication with a pump (not shown) of the system for receiving, as is represented by the arrow designated "P," hydraulic fluid or other fluid under pressure from the pump. Similarly, bore 32 may be coupled in fluid communication with a clutch (not shown) or other actuator of the system for supplying, as is represented by the arrows designated "C," the fluid under pressure that is received from the pump port 30. Bore 34, in turn, may be coupled in fluid communication with a tank (not shown) of the system for returning, as is represented by the arrow designated "T," to the tank the fluid supplied to the clutch via clutch port 32. Although ports 30, 32, and 34 are shown for the illustrative purpose of the present discourse as being provided as the bores formed within manifold 12, it should be appreciated and considered within the scope of the invention herein involved that hoses, tubing, or other connections alternatively may be used for connecting the ports to the corresponding system element or function, with the term "port" being used herein in a broad sense to include such other connections. Although a radially opening arrangement of ports 30, 32, and 34 within manifold 12 is shown in FIG. 1, it should be appreciated that other arrangements may be substituted, such as wherein on or more of the ports opens axially to the valve 10 as is shown, for example, in commonly-assigned U.S. Pat. Nos. 6,571,828; 6,405,746; 6,286,535; and 5,836,335.

Pilot valve subassembly 18 includes a shell, 38, which houses a coil, 40, which, in turn, surrounds a plunger, 42, and a pin, 44, with pin 44 extending within a pole piece, 46, coaxially with axis 22. As proportionally controlled by the energization of coil 40, plunger 42 forces pin 44 axially towards the cage 20 with pin 44, in turn, urging a ball, 48, towards a sealing engagement with a valve seat, 50, formed within a stop, 52, fitted within an end, 54, of the cage 20. Cage 20 is closed at its other end, 56, by a plug, 58.

Figure 2:
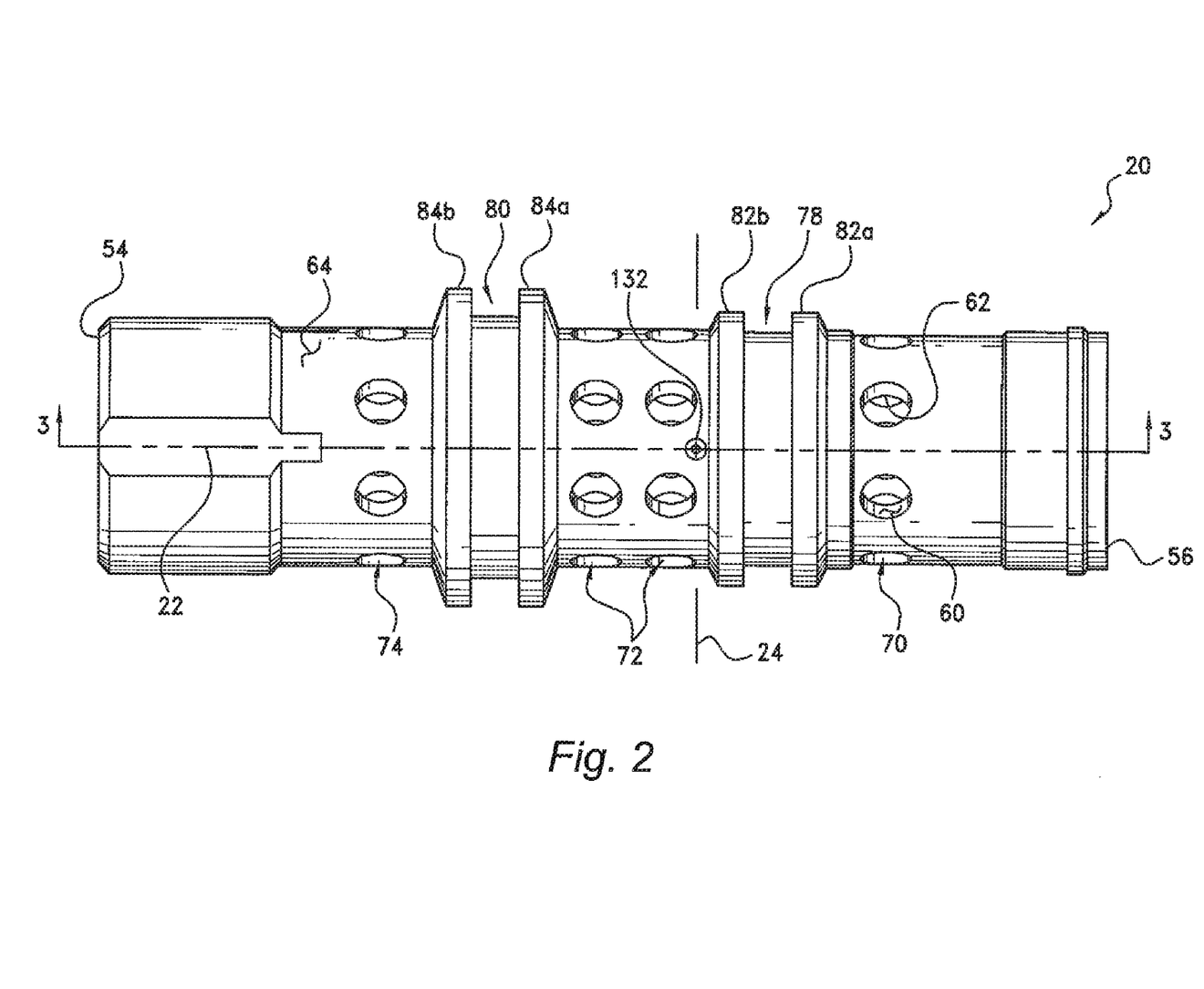
FIG. 2 is a side view of the cage of the valve of FIG. 1.
Figure 3:
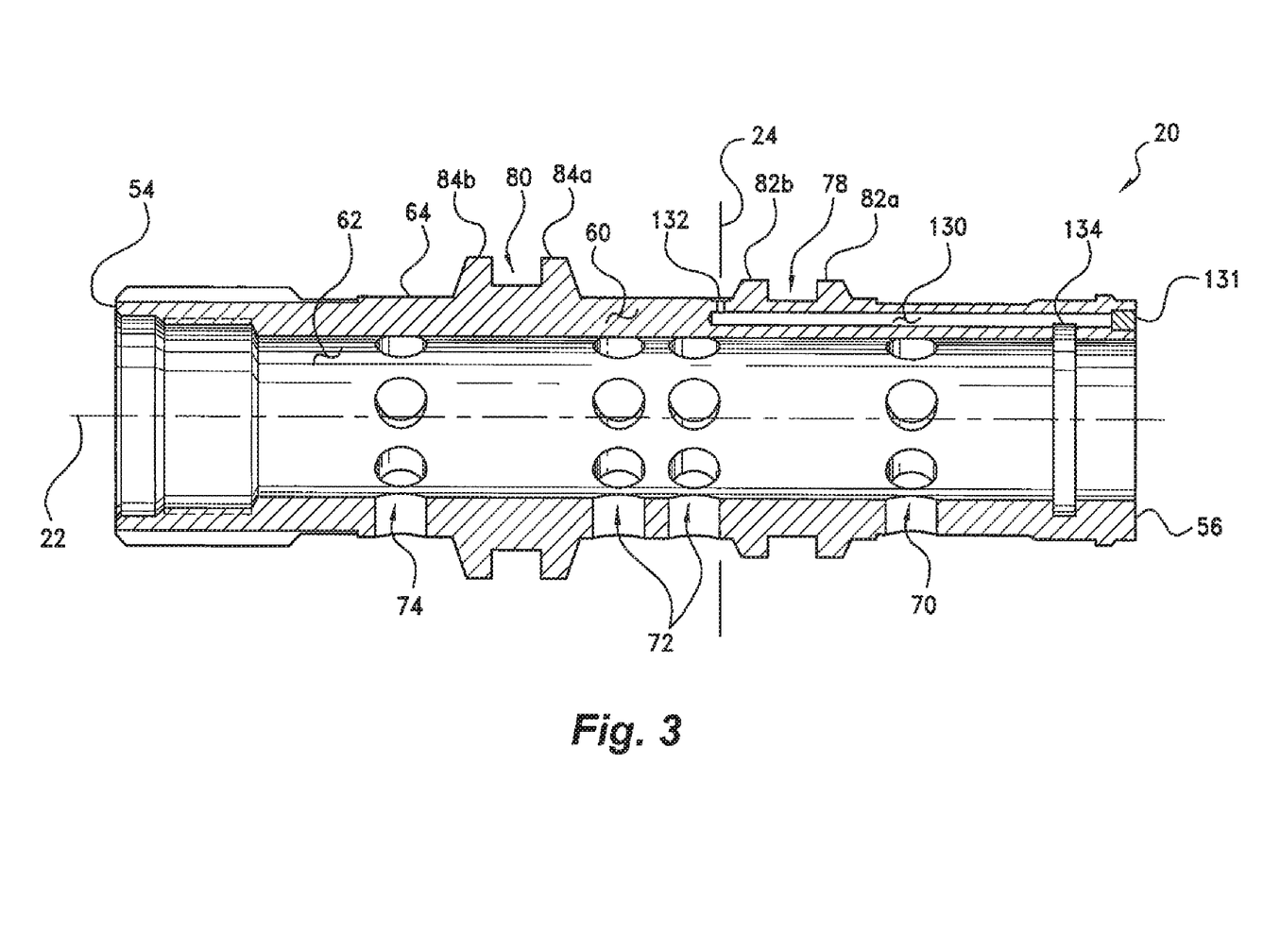
FIG. 3 is an axial cross-section view of the cage of FIG. 2 taken through line 3-3 of FIG. 2.

Cage 20, as may be seen better with additional momentary reference to FIGS. 2 and 3, itself includes a wall, 60, having an inner surface, 62, and an outer surface, 64, which together define a thickness dimension therebetween. For fluid communication with ports 30, 32, and 34, wall 60 is provided has having a axially spaced-apart arrangements of radial holes formed therethrough which together define corresponding pump, clutch, and tank port openings, 70 (shown in phantom in FIG. 1, see also FIG. 4), 72, and 74, respectively.

With continuing reference to FIG. 1, each of openings 70, 72, and 74 may be isolated within bore 16 from the other openings by a series of o-rings or other seals, commonly referenced at 76, which may be mounted on the cage outer surface 64 as received with an associated groove, 78 and 80, defined intermediate a pair of lands, 82a-b and 84a-b. The tank port opening additionally may isolated by the O-rings 76 which may be received within the grooves 86 and 88 defined between lands 90a-b provided on adapter 14. Additional seals 76 may be provided such as shown for sealing pilot valve subassembly 18 to adapter 14, subassembly shell 38 to coil 40, and stop 52 to cage 20.

Spool 26 is received within cage 20 to be moveable relative to the cage axially along axis 22 for selectively controlling fluid flow between the clutch port opening 72 and the pump and tank port openings 70 and 74. In this regard, spool 26 has at one end, 92, a feedback pressure surface, 100, which is responsive to an applied feedback fluid pressure developed by a feedback flow for urging the spool to move axially relative to cage 20 in the direction of solenoid valve subassembly 18 and towards a first position (shown in FIG. 1), allowing fluid flow between the clutch and tank ports 32 and 34 in the manner to be described.

At its other end, 101, spool 26 has a control pressure surface, 102, which is responsive to an applied control fluid pressure developed by a pilot flow in a variable-volume control pressure chamber for urging the spool to move axially relative to cage 20 in the opposite direction, i.e., in the direction of the manifold 12, and towards a second position (shown in FIG. 4), allowing metered fluid flow between the pump and clutch ports 30 and 32. For developing the control fluid pressure, spool 26 has a supply passage, referenced at 104, formed therein for receiving the pilot flow from the pump port opening 70 and delivering the flow into the control pressure chamber. Accordingly, supply passage 104 has an inlet end, 106, which opens into fluid communication with the pump port opening 70, and an outlet end, 108, which opens into fluid communication with the variable-volume control pressure chamber, referenced at 110, which may be defined within cage 20 intermediate the stop 52 and the control pressure surface 102. For restricting the rate at which fluid may flow into the chamber 110, an orifice, 112, may be formed into the spool end 101, or as shown, provided as a separate plug which may be screwed into or otherwise connected to the spool end 101 and thereby which also may define a portion of the control pressure surface 102. The fluid flow through the supply passage 104 may be filtered by means of an in-line screen, 114, which may be received in the passage 104 intermediate the ends 106 and 108 thereof.

The control pressure chamber 110 has an outlet passage, 120, which may be formed as a throughbore in stop 52 having an end in fluid communication with the chamber 110 and an opposite end about which the valve seat 50 is formed. As shown in FIG. 1, the outlet passage 120 may be normally open such than fluid flow to the tank port 30 through the supply passage 104 may flow out of the outlet passage 120 and be returned to tank via an outlet opening, 122, formed in the adapter 14 which is coupled in fluid communication with the tank port 34. However, as controlled by the energization of the pilot valve subassembly 18 whereupon the ball 48 is urged into sealing communication with the valve seat 50 (as shown in FIG. 4) by the actuation of the pin 44, the outlet passage 120 may be closed or partially closed, i.e., throttled, so as to developed the fluid pressure within the control pressure chamber which is applied to the control pressure surface 102 of the spool 26.

Similarly, the feedback pressure surface 100 of spool 26 is responsive to the counter-balancing applied feedback fluid pressure which may be developed by the feedback flow into a variable-volume feedback pressure chamber for urging the spool to move towards the first position shown in FIG. 1 allowing full fluid flow between the clutch and tanks ports 32 and 34, with the control pressure outlet passage 120 being open to return the pilot flow from the pump port 30 to the tank. For developing the feedback fluid pressure, cage 20 has a feedback pressure passage, referenced at 130, formed therein for admitting fluid flow from the clutch port 32 into the feedback pressure chamber. Accordingly, feedback pressure passage 130 has an inlet end, 132, which opens into fluid communication with the clutch port 32, and an outlet end, 134, which opens into fluid communication with the variable-volume feedback pressure chamber, referenced at 140, which may be defined within cage 20 intermediate the plug 58 and the feedback pressure surface 100. Spool 26 may be biased in its first position by a spring, 142, interposed between the spool feedback pressure surface 100 and the plug 58.

Figure 4:
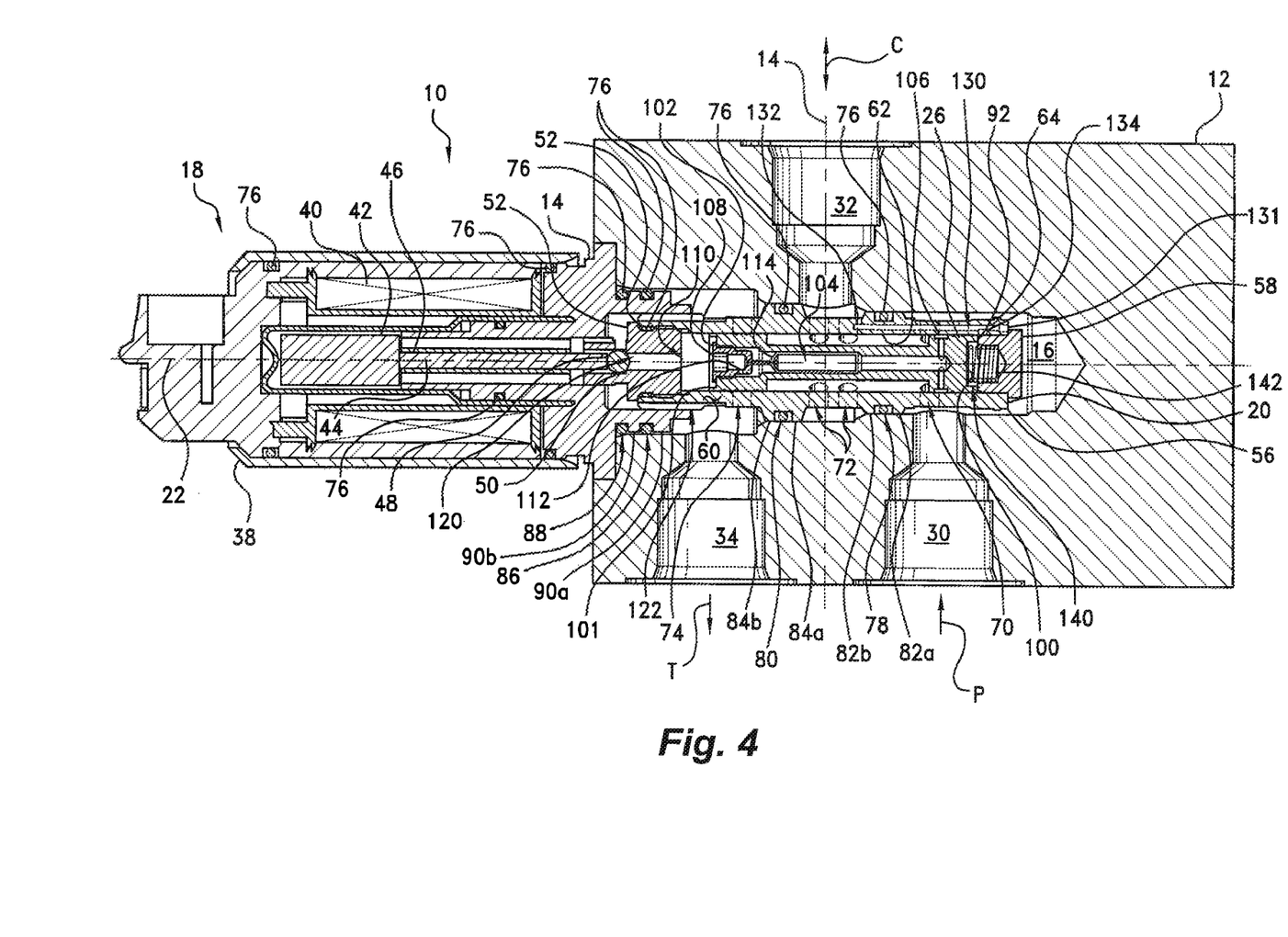
FIG. 4 is an axial cross-section view as in FIG. 1, but as showing the valve in a full energized orientation.

Looking now to FIG. 3 in conjunction with the cross-sectional view of FIG. 4 wherein spool 26 is shown in enhanced detail, it may be seen that feedback pressure passage 130 may be drilled, such as with the drill opening plugged or otherwise filled as at 131, or otherwise machined or formed into the thickness dimension of the cage wall 60 to extend generally axial intermediate the ends 132 and 134. Moreover, each of the ends 132 and 134 may be configured as radially-opening ports, with outlet end 134 being configured, for example, as an annular slot which opens radially into the feedback pressure chamber 140 (FIGS. 1 and 4) through the spool inner surface 62. Inlet end 132, in turn, may be configured as a restriction orifice which opens radially into fluid communication with the clutch port 32 (FIGS. 1 and 4) through the spool outer surface 64, such orifice being provided to restrict the rate at which fluid may flow between the clutch port 32 and the feedback pressure chamber 140.

Returning to FIG. 1, the operation of the valve 10 may commence in use with the pilot valve subassembly 18 being de-energized, i.e., 0% electrical input, such that spool 26 is biased in its first position by the force of spring 142, with the clutch port 32 being fully open, i.e., at substantially zero tank and clutch pressure, to the tank port 34 via the clutch and tank port openings 72 and 74, and with the control pressure chamber outlet passage 120 being fully open such that pilot flow from the pump port 30 is open to the tank port 34 via the pump port opening 70, supply passage 104, outlet passage 120, and the outlet opening 122. In such state, flow between the pump and clutch ports 30 and 32 is blocked by the position of the spool 26, with the applied pressure in the feedback pressure chamber being the substantially zero pressure of the clutch port 32.

Referring now to FIG. 4, with the pilot valve subassembly 18 being energized, i.e., 100% electrical input, spool 26 is made to shift to its second position by the application on the spool control pressure surface 102 of the control fluid pressure, i.e., pilot pressure, developed in control pressure chamber 110 by the closure or throttling of the control pressure chamber outlet passage 120 by the ball 48. In this state, flow between the clutch and tank ports 32 and 34 is blocked by the position of the spool 26, with the clutch port 32 being open to the pump port 30 via the pump and clutch port openings 70 and 72, and with the tank port opening 70 also being open to the supply passage inlet end 106 to provide pilot flow into the control pressure chamber 120. Further in such state, the developed clutch port pressure is communicated into the feedback pressure chamber 140 via feedback flow from the clutch port 32 into the chamber 140. That is, fluid is received from the clutch port 32 through the orifice 132 and into the feedback pressure passage 130 and, through the outlet 134, into the feedback pressure chamber 140. Such flow into the chamber 140 develops the feedback fluid pressure which is applied to the spool feedback pressure 100 as a counter-balancing or dampening force to the control fluid pressure being applied on the spool control pressure surface 102.

Figure 5:
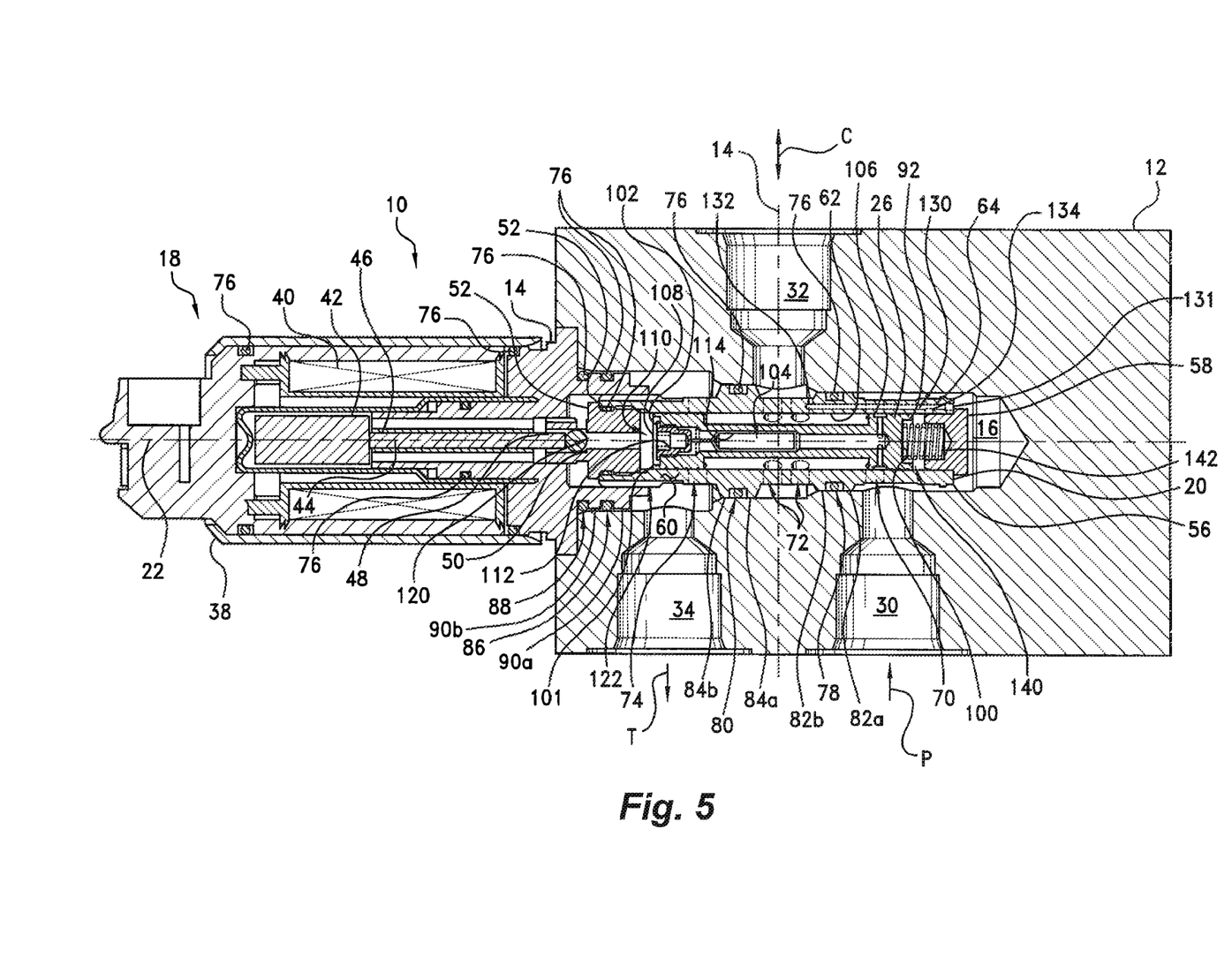
FIG. 5 is an axial cross-section view as in FIGS. 1 and 4, but as showing the valve in a partial energized orientation such as for clutch pressure ramp-up.

Turning lastly to FIG. 5, an transitional orientation of the valve 10 is shown, such as with the pilot valve subassembly 18 being 50% energized, wherein spool 26 is shifted to an intermediate position between its first and second positions which have been described in connection with FIGS. 1 and 4. In such position, as may be seen in FIG. 5, flow between the pump and clutch ports 30 and 32 is throttled, as is the flow between the pump and tank ports 30 and 34, and the flow out of the control pressure chamber 110 via the outlet passage 120. Such partial opening of the pump port 30 to the clutch port 32, along with the partial throttling of the flows to the tank port 34, results in the ramp-up of pressure at the clutch port 32. It has been observed that the provision of the feedback pressure passage 130 as herein described allows a truer clutch pressure may be sensed and communicated into the feedback pressure chamber 140 insofar as the clutch port 32 is directly coupled to the chamber via the passage 130. In this regard, the effects of pressure losses in the clutch pressure attributable to the pressure drop of fluid flow across the cage openings 70 and 72 may be eliminated. Moreover, by isolating the passage 130 from the high velocity flow of fluid through the openings 70 and 72, a more static-like clutch pressure may be measured. Ultimately, the throughput of the valve 10 of the present invention may be increased without appreciably affecting its stability of operation.

Thus, a proportional control valve construction is described which provides reliable operation with improved stability even at high flow rates.

Depending upon their materials of construction, the components of the valve assembly of the present invention may be fabricated by molding, forging, machining, or other conventional forming processes. Unless otherwise specified, materials of construction are to be considered conventional for the uses involved. Such materials generally will be corrosion resistant and otherwise selected for compatibility with the fluid being transferred or for desired mechanical, thermal, or other physical properties.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A proportional pressure control valve for installation within a fluid system, the valve comprising when installed within the system:

a cage which extends in an axial direction from a first end having an end face to a second end and in a radial direction, and includes a wall having an inner surface and an outer surface which define a thickness dimension therebetween, and the wall having formed therethrough a pump port opening in fluid communication with a pump port of the system for receiving fluid under pressure, a clutch port opening in fluid communication with a clutch port of the system for supplying such fluid to an actuator, and a tank port opening in fluid communication with a tank port of the system for returning such fluid to a tank;
a spool received within the cage to be moveable axially relative to the cage for controlling fluid flow between the clutch port opening and the pump and tank port openings, the spool having a feedback pressure surface responsive to an applied feedback fluid pressure urging the spool to move axially relative to the cage in a first direction towards a first position allowing fluid flow between the clutch port and the tank port;
a feedback pressure chamber defined within the cage for developing the feedback fluid pressure on the feedback pressure surface of the spool;
a clutch port pressure feedback passage coupling the clutch port in fluid communication with the feedback pressure chamber for admitting a fluid flow from the clutch port into the feedback pressure chamber to develop the feedback fluid pressure on the feedback pressure surface of the spool, the clutch port pressure feedback passage being formed within the thickness dimension of the cage wall through an opening in the end face thereof to extend generally axially intermediate a first port in fluid communication with the feedback pressure chamber and a second port in fluid communication with the clutch port of the system, the first port being disposed between the second port and the cage end wall opening, and the first port opening generally radially into the feedback pressure chamber through the inner surface of the cage; and
a plug inserted into the cage end wall opening, the cage end wall opening being closed by the plug.

2. The control valve of claim 1 wherein the spool further has a control pressure surface responsive to an applied control fluid pressure urging the spool to move axially relative to the cage in a second direction generally opposite the first direction towards a second position allowing fluid flow between the pump port and the clutch port.

3. The control valve of claim 2 wherein:
the spool further has a supply passage formed therein for receiving a fluid flow from the pump port opening of the cage; and
a control pressure chamber is defined within the cage for receiving the fluid flow from the supply passage to develop the control fluid pressure on the control pressure surface of the spool.

4. The control valve of claim 3 wherein the control pressure chamber has an outlet passage, and wherein the control valve further comprises a pilot valve for controlling fluid flow through the control pressure chamber outlet passage to regulate the control fluid pressure developed in the control pressure chamber.

5. The control valve of claim 1 wherein the second port opens generally radially into the system clutch port through the outer surface of the cage.

6. The control valve of claim 1 wherein the second port is configured as a feedback restriction orifice for restricting the rate at which fluid may flow between the clutch port and the feedback pressure chamber.

7. A proportional pressure control valve installed within a fluid system comprising:
a cage which extends in an axial direction from a first end having an end face to a second end and in a radial direction and includes a wall having an inner surface and an outer surface which define a thickness dimension therebetween, and the wall having formed therethrough a pump port opening in fluid communication with a pump port of the system for receiving fluid under pressure, a clutch port opening in fluid communication with a clutch port of the system for supplying such fluid to an actuator, and a tank port opening in fluid communication with a tank port of the system for returning such fluid to a tank;
a spool received within the cage to be moveable axially relative to the cage for controlling fluid flow between the clutch port opening and the pump and tank port openings, the spool having an inner surface and an outer surface which define a thickness dimension therebetween, and a feedback pressure surface responsive to an applied feedback fluid pressure urging the spool to move axially relative to the cage in a first direction towards a first position allowing fluid flow between the clutch port and the tank port;
a feedback pressure chamber defined within the cage for developing the feedback fluid pressure on the feedback pressure surface of the spool;
a clutch port pressure feedback passage coupling the clutch port in fluid communication with the feedback pressure chamber for admitting a fluid flow from the clutch port into the feedback pressure chamber to develop the feedback fluid pressure on the feedback pressure surface of the spool, the clutch port pressure feedback passage being formed within the thickness dimension of the cage wall through an opening in the end face thereof to extend generally axially intermediate a first port in fluid communication with the feedback pressure chamber and a second port in fluid communication with the clutch port of the system, the first port being disposed between the second port and the cage end wall opening, and the first port opening generally radially into the feedback pressure chamber through the inner surface of the cage; and
a plug inserted into the cage end wall opening, the cage end wall opening being closed by the plug.

8. The control valve of claim 7 wherein the spool further has a control pressure surface responsive to an applied control fluid pressure urging the spool to move axially relative to the cage in a second direction generally opposite the first direction towards a second position allowing fluid flow between the pump port and the clutch port.

9. The control valve of claim 8 wherein:
the spool further has a supply passage formed therein for receiving a fluid flow from the pump port opening of the cage; and
a control pressure chamber is defined within the cage for receiving the fluid flow from the supply passage to develop the control fluid pressure on the control pressure surface of the spool.

10. The control valve of claim 9 further wherein the control pressure chamber has an outlet passage, and wherein the control valve further comprises a pilot valve for controlling fluid flow through the control pressure chamber outlet passage to regulate the control fluid pressure developed in the control pressure chamber.

11. The control valve of claim 7 wherein the second port opens generally radially into the system clutch port through the outer surface of the cage.

12. The control valve of claim 7 wherein the second port is configured as a feedback restriction orifice for restricting the rate at which fluid may flow between the clutch port and the feedback pressure chamber.

13. A method of operating a proportional pressure control valve installed within a fluid system, the method comprising the steps of:
  (a) providing the control valve as comprising:
    a cage which extends in an axial direction from a first end having an end face to a second end and in a radial direction and includes a wall having an inner surface and an outer surface which define a thickness dimension therebetween, and the wall having therethrough a pump port opening in fluid communication with a pump port of the system, a clutch port opening in fluid communication with a clutch port of the system, and a tank port opening in fluid communication with a tank port of the system;
    a spool received within the cage to be moveable axially relative to the cage for controlling fluid flow between the clutch port opening and the pump and tank port openings, the spool having an inner surface and an outer surface which define a thickness dimension therebetween, and a feedback pressure surface;
    a feedback pressure chamber defined within the cage;
  a clutch port pressure feedback passage coupling the clutch port in fluid communication with the feedback pressure chamber, the clutch port pressure feedback passage being formed within the thickness dimension of the cage wall through an opening in the end face thereof to extend generally axially intermediate a first port in fluid communication with the feedback pressure chamber and a second port in fluid communication with the clutch port of the system, the first port being disposed between the second port and the cage end wall opening, and the first port opening generally radially into the feedback pressure chamber through the inner surface of the cage; and
    a plug inserted into the cage end wall opening, the cage end wall opening being closed by the plug;
  (b) receiving fluid under pressure from the pump port through the pump port opening; and
  (c) admitting a flow of the fluid under pressure through the a clutch port pressure feedback passage into the feedback pressure chamber to develop a feedback fluid pressure on the feedback pressure surface of the spool urging the spool to move axially relative to the cage in a first direction towards a first position allowing fluid flow between the clutch port and the tank port.

14. The method of claim 13 wherein the control valve further is provided in step (a) with the spool further having a control pressure surface, the method further comprising the step after step (b) of applying a control fluid pressure on the control pressure surface of the spool urging the spool to move axially relative to the cage in a second direction generally opposite the first direction towards a second position allowing fluid flow between the pump port and the clutch port.

15. The method of claim 14 wherein the control valve further is provided in step (a) with the spool further having a supply passage formed therein, the method further comprising the step after step (b) of receiving through the supply passage a flow of the fluid under pressure into a control pressure chamber defined within the cage to develop the control fluid pressure on the control pressure surface of the spool.

16. The method of claim 15 wherein the control valve further is provided in step (a) wherein the control pressure chamber has an outlet passage, and as further comprising a pilot valve, the method further comprising the step after step (b) of actuating the pilot valve to control fluid flow through the control pressure chamber outlet passage and thereby regulate the control fluid pressure developed in the control pressure chamber.

17. The method of claim 13 wherein the second port opens generally radially into the system clutch port through the outer surface of the cage.

18. The method of claim 13 wherein the second port is configured as a feedback restriction orifice restricting the rate in step (c) at which the flow of the fluid under pressure is admitted though the clutch port pressure feedback passage into the feedback pressure chamber.

* * * * *